United States Patent
Zhang et al.

(10) Patent No.: US 10,869,042 B2
(45) Date of Patent: Dec. 15, 2020

(54) TEMPLATE BASED ADAPTIVE WEIGHTED BI-PREDICTION FOR VIDEO CODING

(71) Applicant: HULU, LLC, Santa Monica, CA (US)

(72) Inventors: Wenhao Zhang, Beijing (CN); Deliang Fu, Beijing (CN); Min Gao, Beijing (CN); Juncheng Ma, Beijing (CN); Chen Liu, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 16/370,257

(22) Filed: Mar. 29, 2019

(65) Prior Publication Data

US 2019/0306512 A1    Oct. 3, 2019

Related U.S. Application Data

(60) Provisional application No. 62/650,864, filed on Mar. 30, 2018.

(51) Int. Cl.
*H04N 19/159*        (2014.01)
*H04N 19/184*        (2014.01)
(Continued)

(52) U.S. Cl.
CPC ......... *H04N 19/159* (2014.11); *H04N 19/176* (2014.11); *H04N 19/184* (2014.11)

(58) Field of Classification Search
None
See application file for complete search history.

(56) References Cited

U.S. PATENT DOCUMENTS

2006/0093038 A1    5/2006  Boyce
2012/0236943 A1*   9/2012  Lee ............... H04N 19/61
                                                375/240.16
(Continued)

FOREIGN PATENT DOCUMENTS

EP    3 273 692 A1       1/2018
KR    10-2013-0003816 A  1/2013
KR    10-2018-0016390 A  2/2018

OTHER PUBLICATIONS

International Search Report & Written Opinion for PCT Application PCT/US2019/025043 dated Jul. 18, 2019, 11 pages.
(Continued)

*Primary Examiner* — Talha M Nawaz
(74) *Attorney, Agent, or Firm* — Fountainhead Law Group, PC

(57) ABSTRACT

In one embodiment, a method selects a first reference block in a first reference frame and a second reference block in a second reference frame. The first reference block and the second reference block are used to predict a current block in a current frame. A first region is selected based on the first reference block, a second region is selected based the second reference block, and a third region is selected based on the current block. The method compares a characteristic of the first region to a characteristic of the third region and compares a characteristic of the second region to the characteristic of the third region to adaptively determine a first weight for the first reference block and a second weight for the second reference block. Then, a prediction block is calculated for the current block using the first weight and the second weight.

20 Claims, 8 Drawing Sheets

(51) Int. Cl.
*H04N 19/103* (2014.01)
*H04N 19/176* (2014.01)

(56) References Cited

U.S. PATENT DOCUMENTS

2018/0295385 A1* 10/2018 Alshin .................. H04N 19/176
2019/0306512 A1* 10/2019 Zhang .................. H04N 19/137

OTHER PUBLICATIONS

Bross et al.: "Versatile Video Coding (Draft 4)"; Joint Video Experts Team (JVET) of ITU-T SG 16 WP 3 and ISO/IEC JTC 1/SC 29/WG 11; 13th Meeting: Marrakech, MA, Jan. 9-18, 2019; 248 pages.

* cited by examiner $$C_{i,j} = \underbrace{w_0}_{302\text{-}1} R0_{i,j} + \underbrace{w_1}_{302\text{-}2} R1_{i,j}$$

adaptive weighted blending

FIG. 3

TEMPLATE BASED ADAPTIVE WEIGHTED BI-PREDICTION FOR VIDEO CODING

CROSS REFERENCE TO RELATED APPLICATIONS

Pursuant to 35 U.S.C. § 119(e), this application is entitled to and claims the benefit of the filing date of U.S. Provisional App. No. 62/650,864 filed Mar. 30, 2018, the content of which is incorporated herein by reference in its entirety for all purposes.

BACKGROUND

Inter prediction, such as inter bi-prediction, predicts a current block using reference blocks in other frames in video coding frameworks. Given a current block being decoded from a current frame using bi-prediction, a transcoder copies two inter predicted reference blocks from two reference frames and blends the reference blocks together to generate a prediction block for the current block being decoded. The prediction block is used as a prediction for the current block. For example, the transcoder calculates a residual, which is a difference between the prediction block and the current block. The transcoder sends the residual in the encoded bitstream to a decoder instead of the pixel values for the current block.

Video content contains many kinds of variations in different characteristics, such as luminance variations. The variations may introduce bias into the inter prediction. For example, the luminance variation in one of the inter predicted blocks from the current block may reduce the prediction accuracy, which reduces the final compression efficiency. If there is a change in luminance in one of the reference blocks, that reference block may not be a good prediction of the current block. When a reference block is not a good prediction, the residual of the difference between the current block and the prediction block is larger, which uses more bandwidth in the encoded bitstream.

BRIEF DESCRIPTION OF THE DRAWINGS

FIG. 3 depicts an example of an equation that uses adaptive weighted blending of the weights in the bi-prediction process according to some embodiments.

DETAILED DESCRIPTION

Described herein are techniques for a video coding system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments use a bi-prediction process that weights the reference blocks differently when generating a prediction block that is used to predict a current block of pixels. A first template region, such as an L-shaped region, of decoded neighboring pixels to a current block and template regions for the reference blocks that are being used to predict the current block are identified. The templates are used to calculate the weights that are used to blend the reference blocks to generate a prediction block when using bi-prediction. The weights may be calculated by a transcoder and signaled to the decoder, or may be calculated by the decoder.

When decoding a current block, the pixels of the current block are not known by the decoder and cannot be used to generate the weights. However, since the templates are close to the current block and the reference blocks, characteristics of the templates, such as the luminance of the templates, may be a good representation of the luminance of the current block and the reference blocks, respectively. The luminance may be the intensity of light and may change across the current block and at least one of the reference blocks. As a result, the transcoder or decoder can change the weights adaptively according to the luminance difference between the current block and each of the reference blocks. Specifically, a weight for a reference block may be smaller if there is bigger luminance gap between the current block and a first reference block compared to a second reference block and the current block. And, vice versa, a weight for a first reference block may be larger if there is smaller luminance gap between the current block and a second reference block compared to the first reference block and the current block. By adjusting the weights adaptively, the accuracy of bi-prediction can be enhanced and the efficiency of inter prediction may be improved. As a result, a better overall video compression performance can be obtained, which will save bandwidth in the video transmission.

System Overview

Figure 1:
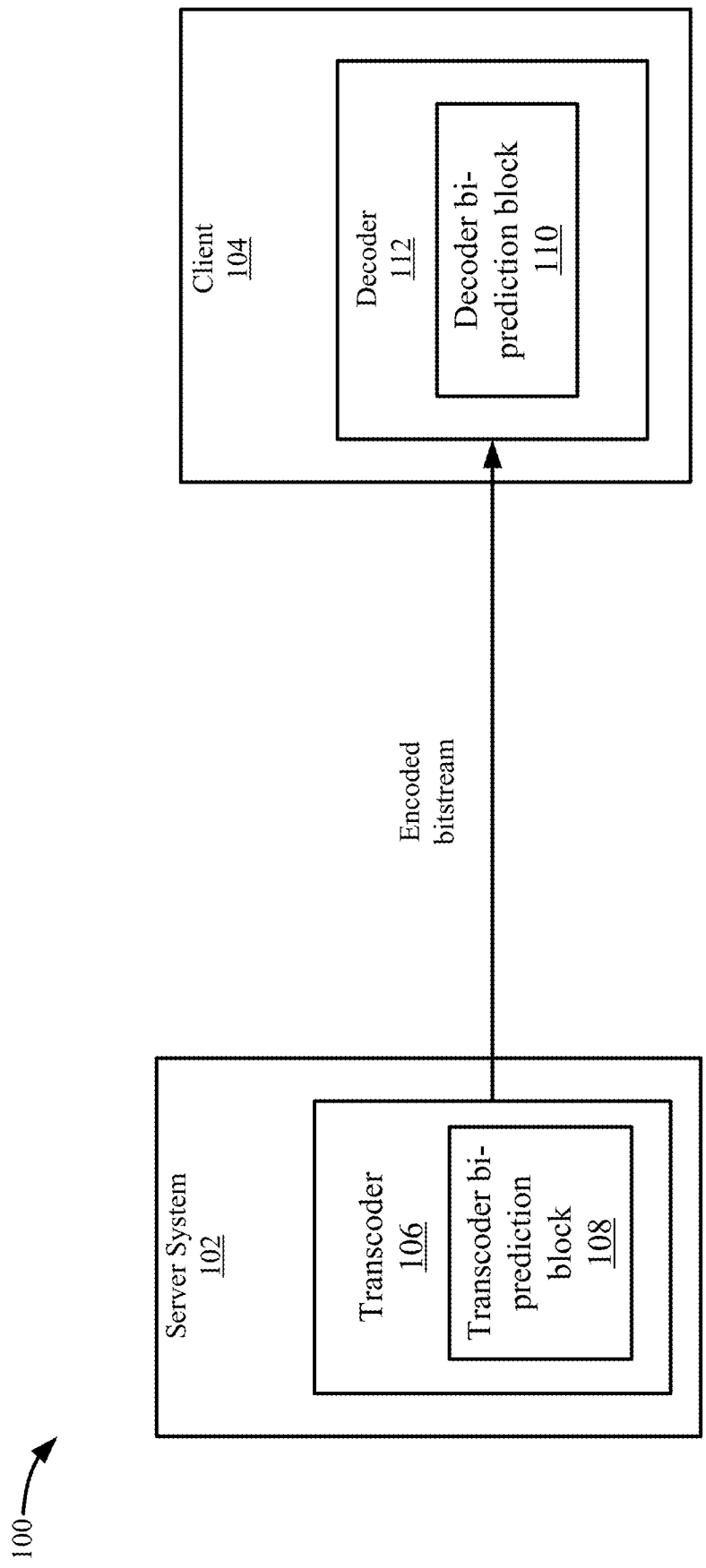
FIG. 1 depicts a simplified system for using weighted bi-prediction according to some embodiments.

FIG. 1 depicts a simplified system 100 for using weighted bi-prediction according to some embodiments. System 100 transcodes a source video asset, which may be any type of video, such as for a television show, movie, or video clip. The source video may need to be transcoded into one or more formats, such as one or more bitrates. In some embodiments, a server system 102 sends an encoded bitstream to client 104. For example, server system 102 may be sending a video to a client 104 for playback.

Server system 102 includes a transcoder 106 that transcodes video into an encoded bitstream. Transcoder 106 may be a software video processor/transcoder configured on a computer processing unit (CPU), a hardware accelerated video processor/transcoder with a graphical processing unit (GPU), a field programmable gate array (FPGA), and/or a hardware processor/transcoder implemented in an application-specific integrated circuit (ASIC). Transcoding may be the conversion from one digital format to another digital format. Transcoding may involve decoding the source format and encoding the source video into another digital format, or converting the source content into videos with a specific resolution, framerate, bitrate, codec, etc. Also, encoding may be the conversion of analog source content and to a digital format. As used, the term transcoding may include encoding.

During the transcoding process, a transcoder bi-prediction block 108 performs a bi-prediction process for a current block of a current frame. Inter-prediction uses reference blocks from frames other than the current frame. Bi-prediction uses a first reference block from a first frame and a second reference block from a second frame to predict the current block. In some embodiments, the first frame is before the current frame and the second frame is after the current frame; however, the first frame and the second frame may be both before the current frame or both after the current frame.

Transcoder bi-prediction block 108 identifies a first reference block in a first reference frame and a second reference block in a second reference frame using a motion search process. After identifying the first reference block and the second reference block, transcoder bi-prediction block 108 may perform different processes based on whether the adaptive weight calculation will be performed on the transcoder side or the decoder side. If on the decoder side, transcoder bi-prediction block 108 determines signaling values for the bi-prediction mode. The signaling values may be the values for a first motion vector that points from the current block to the first reference block and a second motion vector that points from the current block to the second reference block. Transcoder bi-prediction block 108 calculates a prediction block by blending pixel values from the reference blocks with equal weight. Then, transcoder bi-prediction block 108 calculates a residual of the difference between the current block and the prediction block and inserts the residual into the encoded bitstream. The number of bits for the residual is expected to be less than the number of bits required to signal pixel values for the current block. Also, transcoder bi-prediction block 108 inserts a flag with a value that indicates that the adaptive weight bi-prediction mode should be used in the decoding process.

Client 104 includes a decoder 112 that decodes the encoded bitstream. During the decoding process, a decoder bi-prediction block 110 may blend pixels of reference blocks to generate a prediction block for a current block being decoded. Decoder 112 then uses the prediction block to decode the current block by applying the residual to the prediction block to calculate the pixel values for the current block.

If the adaptive weight calculation is performed on the decoder side, decoder bi-prediction block 110 may adaptively determine weights that are used to blend pixels of the reference blocks. Then, decoder bi-prediction block 110 generates the prediction block using the weights and pixel values for the reference blocks. Decoder bi-prediction block 110 decodes the current block by applying the residual to the prediction block.

As discussed above, the adaptive weight calculation may be performed on the transcoder side or the decoder side. If the adaptive weight calculation is performed on the transcoder side, transcoder bi-prediction block 108 may adaptively determine weights that are used to blend pixels of reference blocks for a current block being decoded. Then, transcoder bi-prediction block 108 inserts the values for the weights into the encoded bitstream in addition to the motion vectors. Transcoder bi-prediction block 108 may insert a value for the flag that indicates adaptive weight bi-prediction is not performed in the decoding process. Decoder 112 uses the values to adjust the weights to blend pixels of references blocks for a current block being decoded.

Bi-Prediction Process

Figure 2:
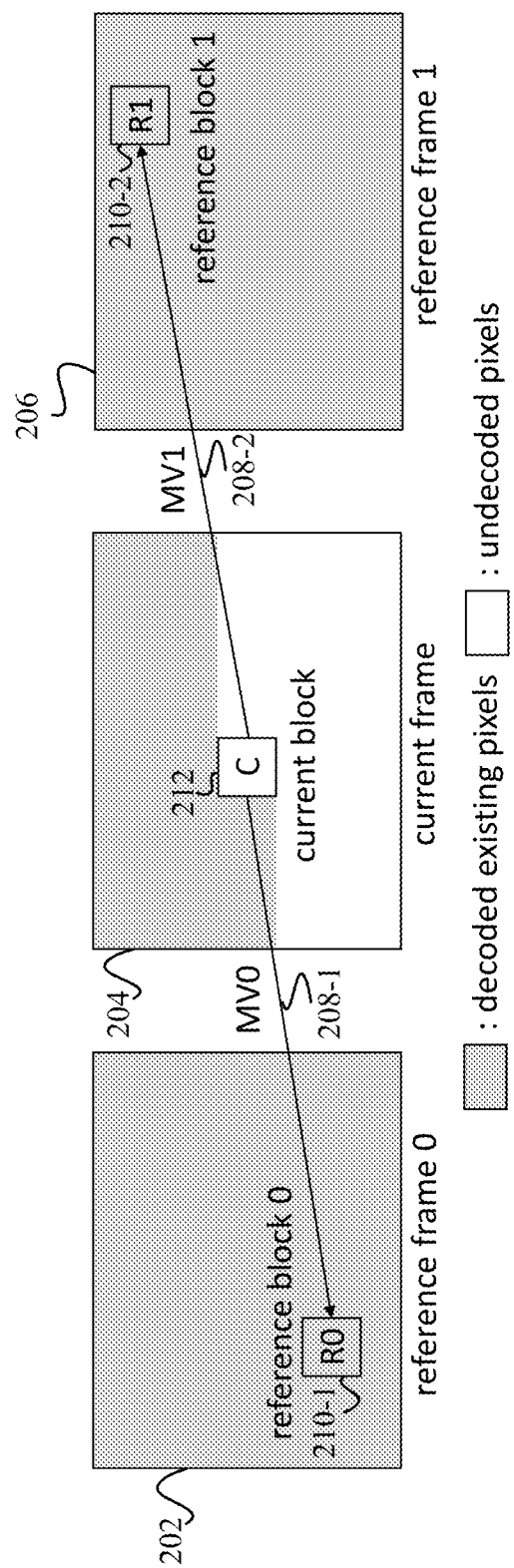
FIG. 2 shows an example of bi-prediction according to some embodiments.

FIG. 2 shows an example of bi-prediction according to some embodiments. Transcoder 106 transcodes a current frame 204. In the transcoding process, transcoder 106 decodes previously transcoded frames to use in the transcoded process of other frames. Here, transcoder 106 has already transcoded and then decoded reference frame 202 (reference frame 0) and reference frame 206 (reference frame 1). Transcoder 106 selects motion vectors (MV) to reference the positions of the reference blocks that are used to predict the current block C. Transcoder 106 may use various motion search methods to select the motion vectors for the reference blocks. Then, transcoder 106 may insert the motion vectors to use in the encoded bitstream along with a flag with a value that indicates whether or not to use adaptive weight bi-prediction on the decoder side. As discussed above, transcoder 106 also generates a prediction block and a residual. The prediction block and resulting residual may be different depending on whether the adaptive weight calculation is performed on the decoder side or the transcoder side.

Decoder 112 receives the encoded bitstream and starts decoding frames. Using the example in FIG. 2, decoder 112 is decoding a current frame 204. Decoder 112 has already decoded reference frame 202 (reference frame 0) and reference frame 206 (reference frame 1). Decoder 112 uses motion vectors (MV) to select the positions of the reference blocks that are used to predict the current block C. For example, transcoder 106 may have inserted the motion vectors for the current block in the encoded bitstream. A motion vector MV0 208-1 points to a reference block R0 210-1 in reference frame 0 and a motion vector MV1 208-2 points to a reference block R1 210-2 in reference frame 1. Decoder 112 generates a prediction block from reference block R0 and reference block R1, and applies the residual to the prediction block to decode the current block.

Transcoder 106 or decoder 112 uses the pixels of reference block R0 and reference block R1 to predict the pixels of current block C 212. For example, conventionally, an average blending pixel by pixel is used:

$$C_{i,j} = \tfrac{1}{2} R0_{i,j} + \tfrac{1}{2} R1_{i,j},$$

where C is the pixels of the current block, R0 is the pixels of the reference block R0, and R1 is the pixels of reference block R1. The values of "½" in the equation weight the pixels of reference block R0 and reference block R1 equally. Accordingly, the pixels of reference block R0 and reference block R1 are given equal weight to predict the pixels of current block C.

If characteristics, such as luminance conditions, change across current block and reference blocks, bias will be introduced by the fixed weight blending of the pixels. In other examples, other characteristics may be used, such as local complexity (e.g., pixel variance, pixel local entropy, amount of edges, and volume of gradient), texture similarity (e.g., edge directions), color difference, temporal distance (e.g., a difference of frame counter in playback order, or difference of time stamps), coding parameters such as a quantization parameter (QP), block size, coding mode (e.g., inter coding motion information, and intra coding motion information), etc. For example, a change in luminance across the current block and the reference block is not captured by the equal weighted blending of pixels of the two reference blocks. This causes prediction accuracy to go down and compression performance to go down. Luminance variation is common in video, such as changes in light conditions (e.g., flashes, fluorescent changes), movement of objects (e.g., from sunshine to shadows), and fade in and fade out shot and scene changes that are added in post processing. Given the frequency of luminance variation, the possibility of the luminance variation affecting prediction accuracy is high.

Adaptive Weighted Blending

Transcoder 106 or decoder 112 may use an adaptive weighted blending of the weights in the bi-prediction process. FIG. 3 depicts an example of an equation that uses adaptive weighted blending of the weights in the bi-prediction process according to some embodiments. At 302-1, a first weight $w_0$ is a weight for pixels of the first reference block R0 and at 302-2, a second weight $w_1$ is a weight for pixels of the second reference block R1. The prediction block $C_{i,j}$ is a combination of the weight $w_0$ multiplied by the pixels of the reference block R0 and the weight $w_1$ multiplied by the pixels of the reference block R1.

Transcoder 106 or decoder 112 may adaptively adjust the weights of $w_0$ and $w_1$ based on the variation of a characteristic between reference block R0 and the current block and between reference block R1 and the current block. For example, transcoder 106 or decoder 112 determines if the luminance of reference block R0 is closer to the luminance of current block C than the luminance of reference block R1 to the luminance of current block C. If so, then transcoder 106 or decoder 112 increases the value for weight $w_0$ and decreases the weight $w_1$. If the luminance of reference block R1 is closer to the luminance of current block C than the luminance of reference block R0 to the luminance of current block C, transcoder 106 or decoder 112 decreases the value for weight $w_0$ and increases the weight $w_1$. The change in the value of the weights may make the blended luminance of the current block C more accurate because the luminance of the reference block that is closer to the luminance of the current block is weighted higher. When the blended luminance is closer to the luminance of the current block, the bi-prediction accuracy and compression efficiency increases because the prediction block includes values that are closer to the current block.

Template Based Adaptive Weighting

Figure 4:
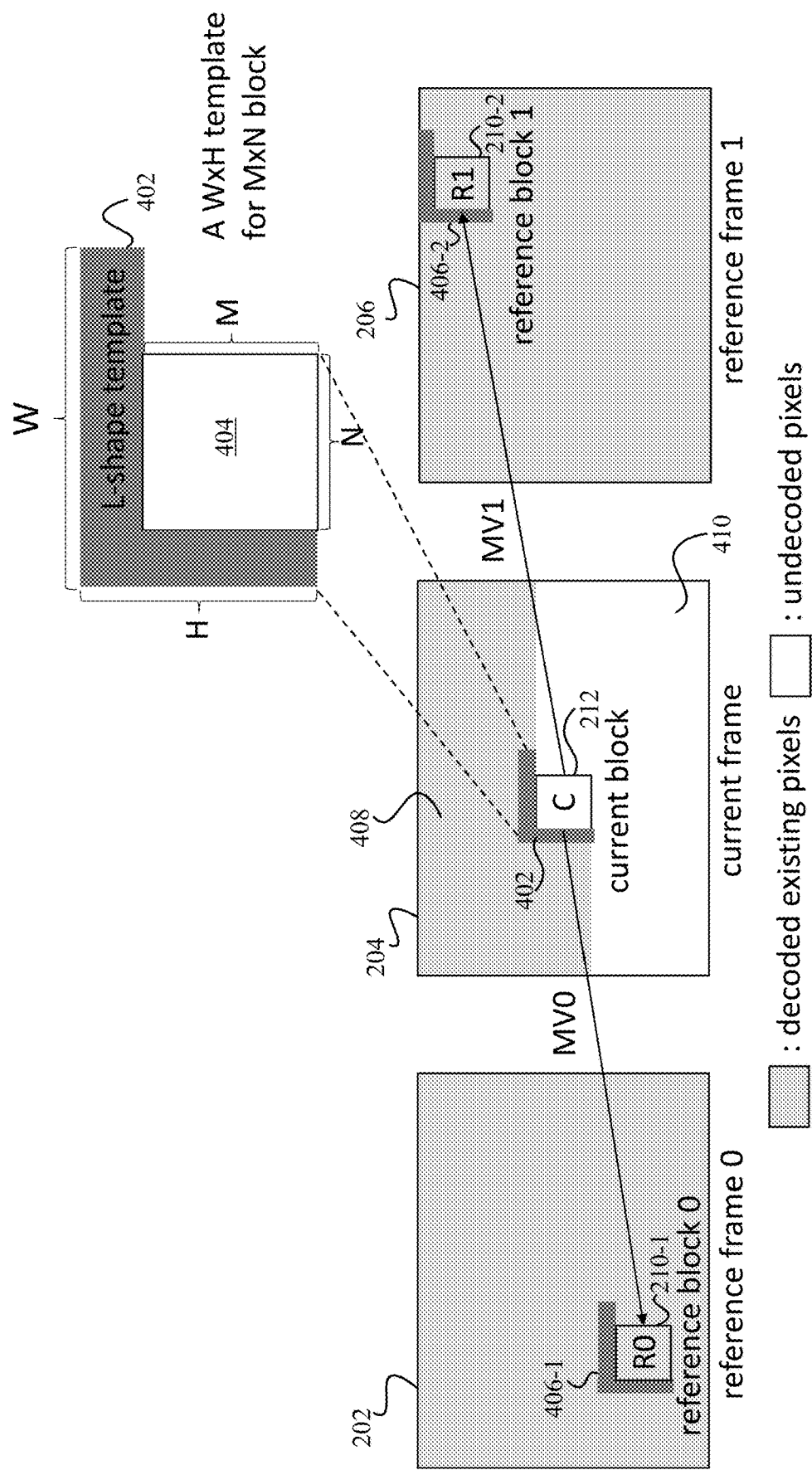
FIG. 4 depicts an example of using templates to determine the weights according to some embodiments.

Transcoder 106 or decoder 112 may determine the weights adaptively using templates. Both scenarios are described with respect to FIG. 4. FIG. 4 depicts an example of using templates to determine the weights according to some embodiments. In the transcoder side scenario, transcoder 106 is transcoding a current frame 204. Transcoder 106 has transcoded and then decoded some blocks in current frame 204 that are represented with shading at 408 and has not decoded some blocks that are represented without shading at 410. Transcoder 106 has already decoded reference frame 202 (reference frame 0) and reference frame 206 (reference frame 1). Transcoder 106 determines a shape, such as a L shape of decoded existing pixels at 402. The L shaped region is a template of a width W and a height H. The L shaped region may be neighboring pixels to a current block 212 of M×N size being decoded. Although an L shaped region is described, other types of shapes may be used, such as the width of the template may not go beyond the top side of the current block.

Transcoder 106 identifies a template 406-1 in the reference frame 0 based on reference block 0 and a template 406-2 in the reference frame 1 based on reference block 1. Template 406-1 and template 406-2 may have the same dimensions as template 402, such as the W×H dimensions. Also, template 406-1 and template 406-2 may also be positioned the same relative to reference blocks 0 and 1, respectively, such as forming an L-shape template next to the left and top sides of the reference blocks 0 and 1, respectively.

Transcoder 106 uses template 406-1 in the reference frame 0, template 402 for the current block, and template 406-2 in the reference frame 1 to adaptively determine the weights. Transcoder 106 uses the templates because current block 0 has not been transcoded yet. Transcoder 106 may use the templates to generate the weights, but may not need to use templates because transcoder 106 knows the decoded values for the current block and the reference blocks. This ensures that both transcoder 106 and decoder 112 use the same process and generating identical results. Thus, transcoder 106 uses decoded pixels in the current frame to determine the values of the weights. In the process, transcoder 106 selects the reference frames to use, such as reference frame 0 and reference frame 1. Also, transcoder 106 selects the motion vectors for the current block being transcoded. The motion vectors identify the positions of the reference blocks R0 and R1. Transcoder 106 then selects templates. For example, transcoder 106 selects an L shaped region around the reference block R0 and R1 as the templates 406-1 and 406-2, respectively. Also, transcoder 106 selects a similarly shaped template 402 for the current block.

Transcoder 106 then uses templates 402, 406-1, and 406-2 to determine the values of the weights. For example, transcoder 106 uses the templates 402, 406-1, and 406-2 to determine a luminance variation. As mentioned above, transcoder 106 uses the L shaped region instead of the pixels inside of the current block being decoded because transcoder 106 does not know the luminance of the current block due to the current block not having been transcoded yet. However, the luminance of the neighboring pixels in the L shaped region may be similar to the luminance of the current block in most cases.

Transcoder 106 then adaptively calculates the weights for the reference blocks, the process of which will be described in more detail below. Transcoder 106 may insert values for the weights in the encoded bitstream along with the motion vectors and a flag with a value that indicates the adaptive weighted bi-prediction is being used. The flag may be set to a first value when the adaptive weighted bi-prediction is being used and a second value when fixed weighted bi-prediction is being used.

When decoder 112 receives the encoded bitstream, decoder 112 uses the weights to blend the pixels of the reference blocks. For example, pixels of one of the reference blocks may be weighted higher than pixels of the other reference block to create the prediction block.

Decoder 112 may also calculate the weights in the decoder side scenario. In this case, decoder 112 receives the encoded bitstream and is decoding a current frame 204. Decoder 112 has decoded some blocks in current frame 204 that are represented with shading at 408 and has not decoded some blocks that are represented without shading at 410. Decoder 112 has already decoded reference frame 202 (reference frame 0) and reference frame 206 (reference frame 1). Decoder 112 determines a shape, such as a L shape of decoded existing pixels at 402. The L shaped region is a template of a width W and a height H. The L shaped region may be neighboring pixels to a current block 212 of M×N size being decoded. Although an L shaped region is described, other types of shapes may be used, such as the width of the template may not go beyond the top side of the current block.

Decoder 112 identifies a template 406-1 in the reference frame 0 based on reference block 0 and a template 406-2 in the reference frame 1 based on reference block 1. Template 406-1 and template 406-2 may have the same dimensions as template 402, such as the W×H dimensions. Also, template 406-1 and template 406-2 may also be positioned the same relative to reference blocks 0 and 1, such as forming an L-shape template next to the left and top sides of the reference blocks 0 and 1, respectively.

Decoder 112 uses template 406-1 in the reference frame 0, template 402 for the current block, and template 406-2 in the reference frame 1 to adaptively determine the weights. The templates are used because current block 0 has not been decoded yet. Thus, decoder 112 uses decoded pixels in the current frame to determine the values of the weights. In the process, decoder 112 receives the encoded bitstream, which indicates the reference frames to use via motion vectors, such as reference frame 0 and reference frame 1. Then, decoder 112 uses the motion vectors to select the positions of the reference blocks R0 and R1. After determining the reference blocks, decoder 112 selects templates. For example, decoder 112 selects an L shaped region around the reference block R0 and the reference block R1 as the templates 406-1 and 406-2, respectively. Also, decoder 112 selects a similarly shaped template 402 for the current block. Decoder 112 then uses templates 402, 406-1, and 406-2 to determine the values of the weights. For example, decoder 112 uses the templates 402, 406-1, and 406-2 to determine the luminance variation. As mentioned above, decoder 112 uses the L shaped region instead of the pixels inside of the current block being decoded because decoder 112 does not know the luminance of the current block due to the current block having not yet been decoded. However, the luminance of the neighboring pixels in the L shaped region may be similar to the luminance of the current block in most cases.

Weight Calculation

Figure 5:
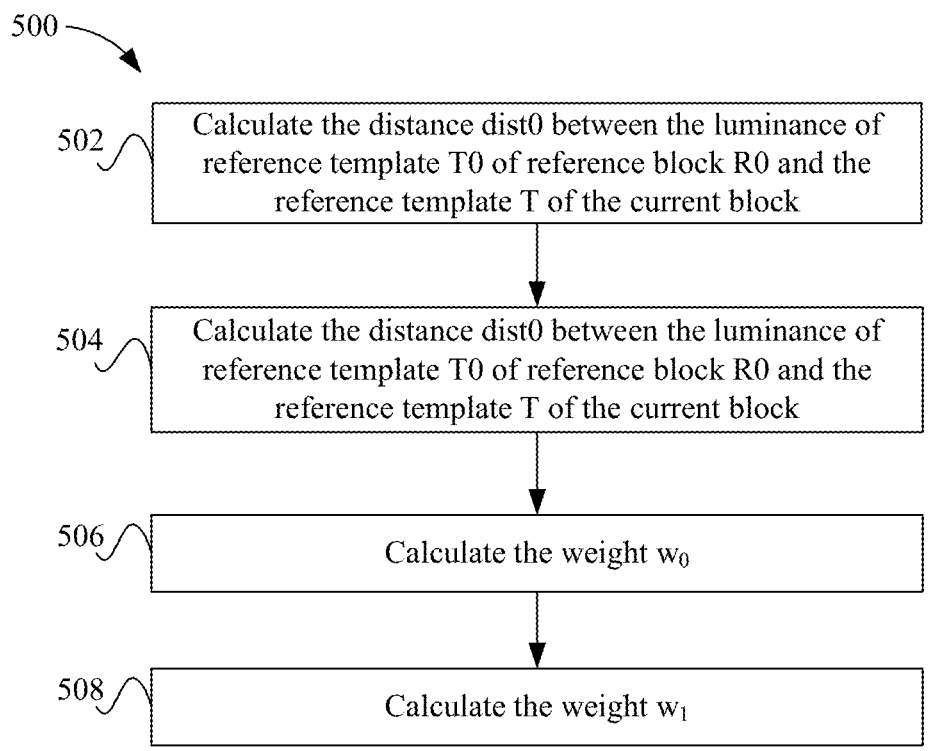
FIG. 5 depicts a simplified flowchart of a method for calculating the weights according to some embodiments.

The weights may be calculated in different ways. As mentioned above, transcoder 106 or decoder 112 may calculate the weights. FIG. 5 depicts a simplified flowchart 500 of a method for calculating the weights according to some embodiments. At 502, transcoder 106 or decoder 112 calculates the distance dist0 between the luminance of reference template T0 of reference block R0 and the reference template T of the current block using:

$$dist0 = \Sigma \|T_{i,j} - T0_{i,j}\|,$$

where the distance dist0 is the sum of the differences between the luminance of each pixel in template T0 406-1 and template T 402 (e.g., per-pixel distance). Although luminance is described, transcoder 106 or decoder 112 may use other characteristics to determine the weights. Also, other methods for calculating the distance may be used.

At 504, transcoder 106 or decoder 112 calculates the distance dist0 between the luminance of reference template T0 of reference block R0 and the reference template T of the current block using:

$$dist1 = \Sigma \|T_{i,j} - T1_{i,j}\|,$$

where the distance dist1 is the sum of the differences between the luminance of each pixel in template T1 and template T (e.g., per-pixel distance). Also, other methods for calculating the distance may be used.

At 506, transcoder 106 or decoder 112 calculates the weight $w_0$. For example, transcoder 106 or decoder 112 calculates the weight $w_0$ using a contribution of the distance dist1 to the total distance of dist0 and dist1. In some examples, transcoder 106 or decoder 112 uses the following to calculate weight $w_0$:

$$w_0 = \frac{dist1}{dist0 + dist1}.$$

In the above equation, the distance dist1 is divided by the sum of the distance dist1 and distance dist0. If the distance dist1 is larger, then the weight $w_0$ will be larger. This means that when the distance between the current template T and the template T1 of reference block R1 is larger, then the weight of reference block R0 is larger because reference block R0 is closer in luminance to the current block.

At 508, transcoder 106 or decoder 112 calculates the weight $w_1$. For example, transcoder 106 or decoder 112 calculates the weight $w_1$ using a contribution of the distance dist0 to the total distance of distance dist0 and distance dist1. In some examples, transcoder 106 or decoder 112 uses the following to calculate weight $w_1$:

$$w_1 = \frac{dist0}{dist0 + dist1}.$$

In the above equation, the distance dist1 is divided by the sum of the distance dist1 and distance dist0. If the distance dist0 is larger, then the weight $w_1$ may be larger. This means that when the distance between the current template T and the template T0 of reference block R0 is larger, then the weight of reference block R1 is larger because reference block R1 is closer in luminance to the current block. Although the above equations are described, other methods of calculating the weights may be used, such as a winner take all process described in FIG. 6.

Figure 6:
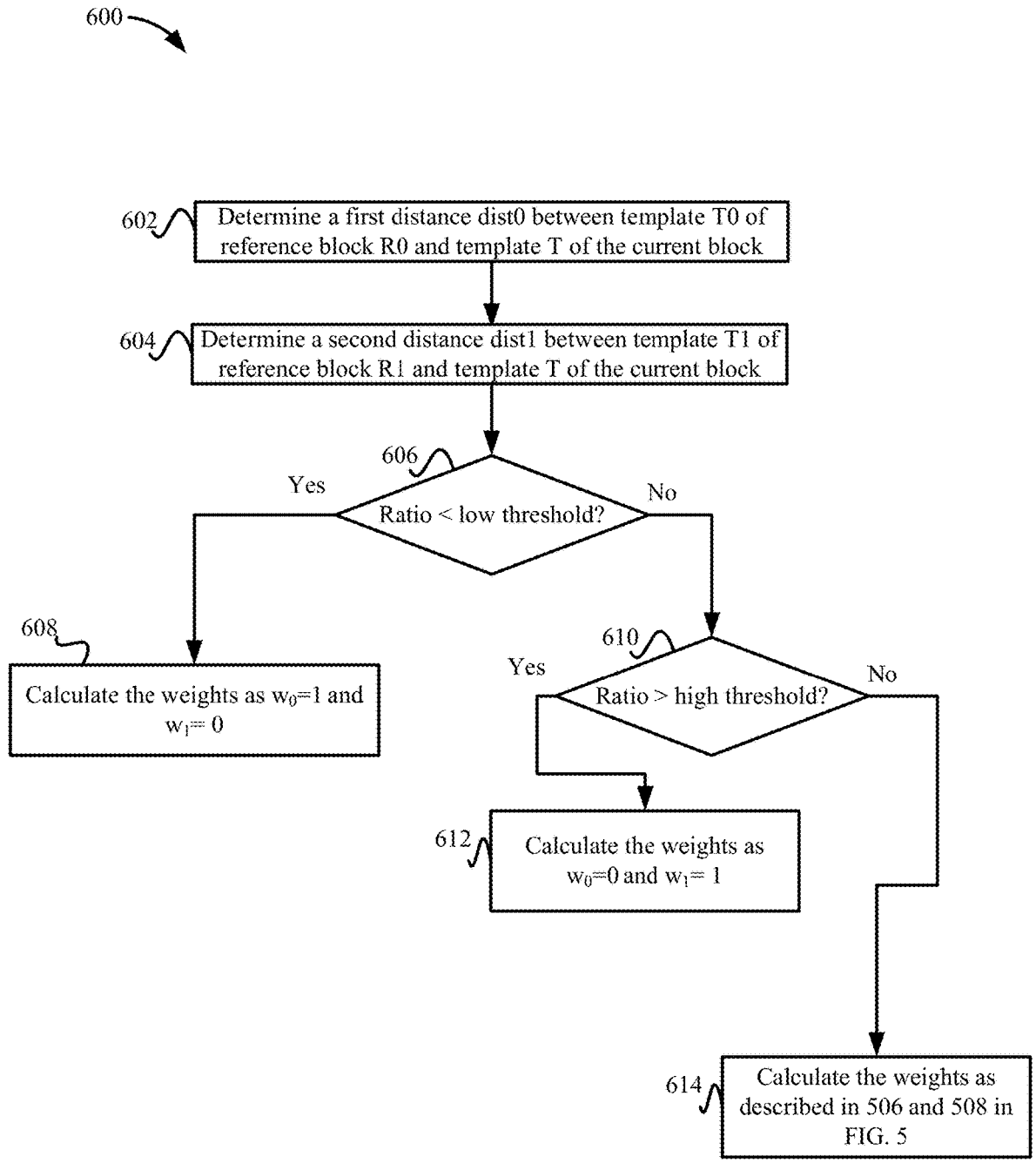
FIG. 6 depicts a simplified flowchart of another example of calculating the weights according to some embodiments.

FIG. 6 depicts a simplified flowchart 600 of another example of calculating the weights according to some embodiments. In this example, transcoder 106 or decoder 112 selects one weight of $w_0$ or $w_1$ instead of adaptively calculating both the weight values. This may occur when one of the differences between the reference block and the current block is large, such as above a threshold value. The large difference indicates that the luminance of the reference block may not be close to the current block and thus may not be used. This results in a single direction prediction being used instead of bi-prediction. In some embodiments, decoder 112 makes the decision to use a uni-prediction even though transcoder 106 used bi-prediction in the transcoding process.

At 602, transcoder 106 or decoder 112 determines a first distance dist0 between template T0 of reference block R0 and template T of the current block. Transcoder 106 or decoder 112 may calculate the distance dist0 similar to described above. At 604, transcoder 106 or decoder 112 determines a second distance dist1 between template T1 of reference block R1 and template T of the current block. Transcoder 106 or decoder 112 may calculate the distance dist1 similar to described above.

At 606, transcoder 106 or decoder 112 determines if a ratio of dist0/dist1 is less than a low threshold value, thresholdLow. At 608, if the ratio of dist0/dist1 is less than the low threshold thresholdLow, then transcoder 106 or decoder 112 calculates the weights as $w_0=1$ and $w_1=0$. In this example, the distance dist1 is large and distance dist0 is small, causing the resulting value of the fraction to be low. This indicates that reference block R1 is not close to the current block (e.g., the luminance of reference block R1 may be very different from the luminance of the current block). At 610, transcoder 106 or decoder 112 determines if a ratio of dist0/dist1 is greater than a high threshold value. At 612, if a ratio of dist0/dist1 is greater than a high threshold, thresholdHigh, then transcoder 106 or decoder 112 calculates the weights as $w_0=0$ and $w_1=1$. In this example, the distance dist1 is small and distance dist0 is large, causing the resulting value of the fraction to be high. This indicates that reference block R0 is not close to the current block (e.g., the luminance of reference block R0 may be very different from the luminance of the current block). At 614, if neither threshold is met, then transcoder 106 or decoder 112 calculates the weights as described in 506 and 508 in FIG. 5, which adaptively calculates both weights for both reference blocks.

Conclusion

Using luminance values for pixels that are close to the current block being decoded may be a more accurate prediction of luminance of the current block compared to using a frame level luminance. The frame level luminance may use a single value of luminance for a frame because a comparison between pixels in the current block and pixels in the reference blocks cannot be used because the current block has not been decoded yet. Transcoder 106 or decoder 112 uses the L-shape template to perform a transcoder side or a decoder side search for the neighboring pixels and use the weighted prediction to change the blending process of bi-prediction.

Accordingly, a prediction block may be more representative of the current block. The use of the templates allows transcoder 106 or decoder 112 to reflect the luminance differences at the block level and not the frame level. This improves the prediction and thus the compression of the current block.

System

Figure 7:
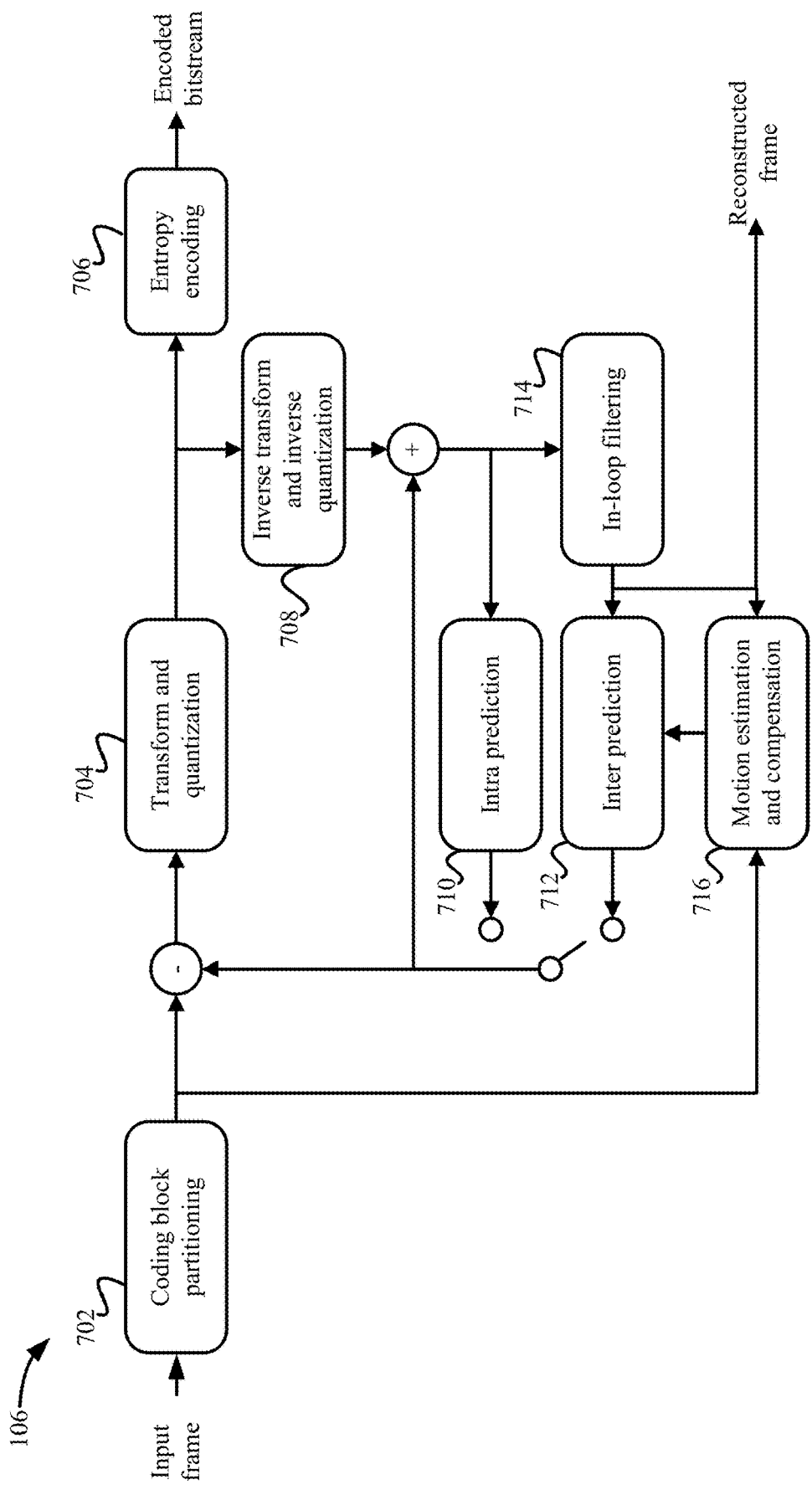
FIG. 7 depicts an example of a transcoding system according to some embodiments.

FIG. 7 depicts an example of a transcoding system according to some embodiments. A video codec framework includes a set of fundamental components: block partitioning, inter and intra prediction, transform and quantization, and entropy coding.

Transcoder 106 receives a frame of a video, which is firstly split into non-overlapping coding blocks for further processing. To cope with different video content characteristics, complex regions will be covered by partitions with smaller sizes, while simple regions will be covered by larger partitions. Multiple block patterns and shapes are may be both used together, for example quad-tree pattern, triple-tree pattern, and binary-tree pattern can be all used together, while square blocks and rectangular blocks can also be used together.

Prediction is used to remove the redundancy of a video signal. By subtracting the predicted pixel values from the pixels being processed, the amplitude of a residual signal can be significantly reduced, thus the resulting bitstream size can be reduced. An intra prediction block 710, which is using reference pixels in the current frame, aims to reduce the spatial redundancy within the frame. An inter prediction block 712, which is using reference pixels from neighboring frames, attempts to remove the temporal redundancy between frames. a motion estimation and compensation block 716 may be a sub-module of inter prediction at the transcoder side, which captures the motion trace of objects among adjacent frames and generates reference pixels for inter prediction.

A transform and quantization block 704 uses the residual pixels after intra or inter prediction. Transform and quantization block 704 performs a transform operation that represents the residual signal in a frequency domain. Considering the human visual system is more sensitive on low frequency components of video signal than the high frequency components, quantization is designed to further compress the residual signal by reducing the precision on high frequency signals.

To avoid the out-of-sync issue between transcoder 106 and decoder 112, transcoder 106 contains decoding modules to make sure both transcoder 106 and decoder 112 are using identical mathematical processes. Thus, an inverse transform and inverse quantization block 708 is similar to the same block on the decoder side. Inverse transform and inverse quantization block 708 reconstructs pixels using the intra and inter prediction.

An in-loop filter 714 removes any visual artifacts that are introduced by the above-mentioned processes. Various filtering methods are applied on the reconstructed frame in a cascaded way to reduce different artifacts, including but not limited to the blocking artifacts, mosquito artifacts, color banding effects, etc.

An entropy encoding block 706 may further compress the bitstream using a model-based method. Transcoder 106 transmits the resulting encoded bitstream to decoder 112 over a network or other types of medium.

Figure 8:
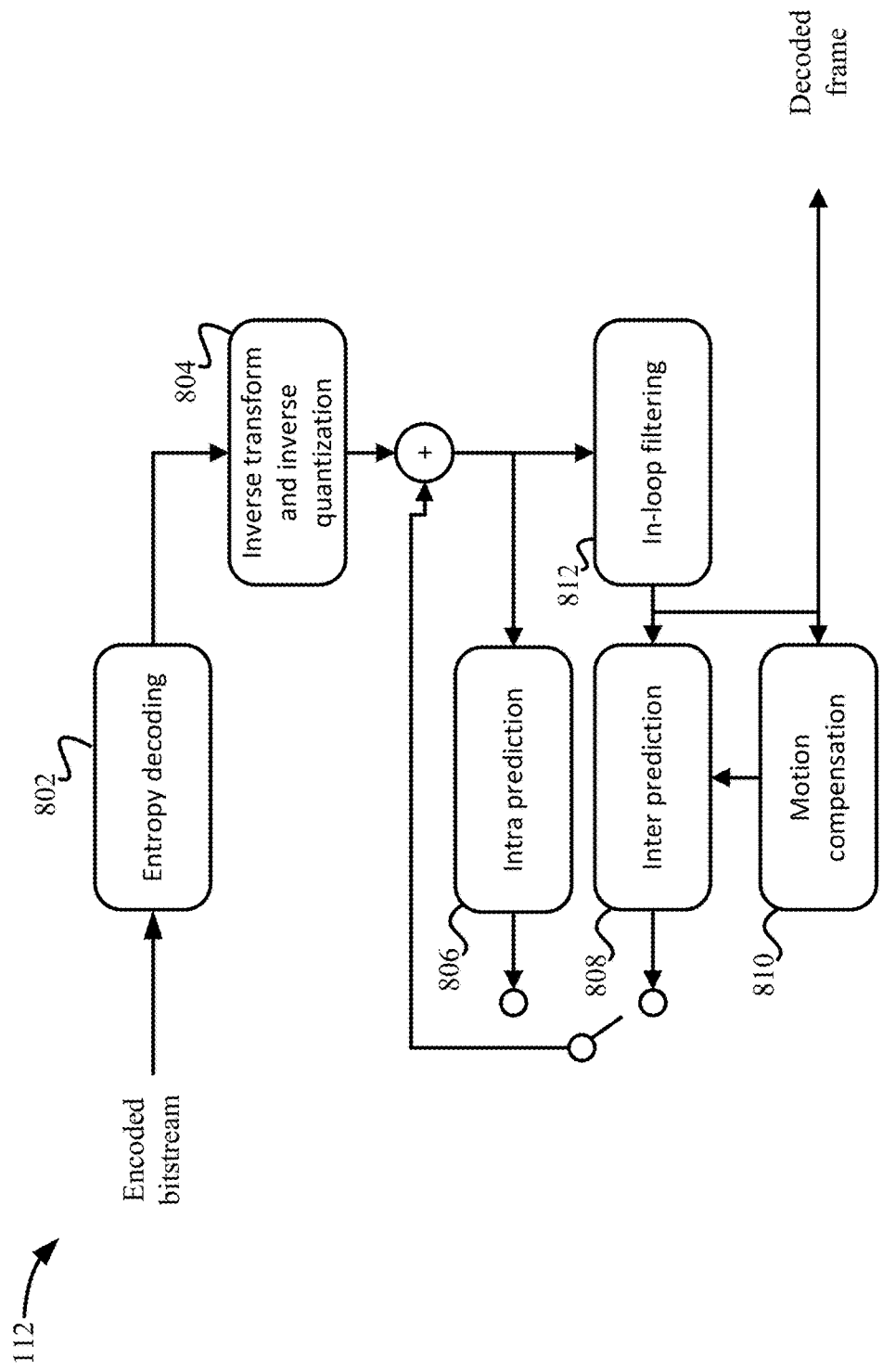
FIG. 8 depicts an example of a decoding system according to some embodiments.

FIG. 8 depicts an example of a decoding system according to some embodiments. Decoder 112 receives the encoded bitstream and inputs it into an entropy decoding block 802 to recover the information needed for decoding process. As above-mentioned, a decoded frame can be decoded by using an inverse transform and inverse quantization block 804, an intra prediction block 806 or inter prediction block 808, motion compensation block 810, and in-loop filtering block 812 in the same way to build a decoded frame.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   selecting, by a computing device, a first reference block in a first reference frame and a second reference block in a second reference frame, the first reference block and the second reference block being used to predict a current block in a current frame;
   selecting, by the computing device, a first region in the first reference frame based on the first reference block, a second region in the second reference frame based the second reference block, and a third region in the current frame based on the current block;

comparing, by the computing device, a characteristic of the first region to a characteristic of the third region to generate a first comparison value;
comparing, by the computing device, a characteristic of the second region to the characteristic of the third region to generate a second comparison value;
calculating, by the computing device, a first weight for the first reference block and a second weight for the second reference block based on the first comparison value and the second comparison value;
adaptively, by the computing device, calculating a prediction block for the current block using the first weight and the second weight; and
using, by the computing device, the prediction block in a transcoding process or a decoding process associated with the current block.

2. The method of claim 1, wherein adaptively calculating the prediction block comprises:
applying the first weight to the first reference block to generate a first result;
applying the second weight to the second reference block to generate a second result; and
blending the first result and the second result to generate the prediction block.

3. The method of claim 2, wherein blending the first result and the second result comprises:
blending first pixel values from the first result with second pixel values from the second result to generate third pixel values for the prediction block.

4. The method of claim 3, wherein blending comprises calculating a sum of the first pixel values and the second pixel values.

5. The method of claim 2, wherein:
applying the first weight to the first reference block comprises applying the first weight to pixels of the first reference block; and
applying the second weight to the second reference block comprises applying the second weight to pixels of the second reference block.

6. The method of claim 1, wherein the first region and the second region are regions that neighbor the first reference block and the second reference block, respectively.

7. The method of claim 1, further comprising:
including a flag that is set to a first value to indicate the current block uses an adaptive weight bi-prediction process, or the flag is set to a second value to indicate the current block uses a fixed-weight bi-prediction process.

8. The method of claim 1, wherein:
comparing the characteristic of the first region to the characteristic of the third region comprises using a first per-pixel distance between the first region and the third region, and
comparing the characteristic of the second region to the characteristic of the third region comprises using a second per-pixel distance between the second region and the third region.

9. The method of claim 8, wherein comparing the characteristic of the first region to the characteristic of the third region and comparing the characteristic of the second region to the characteristic of the third region comprises:
calculating a first ratio using the second per-pixel distance divided by the first per-pixel distance and the second per-pixel distance;
calculating a second ratio using the first per-pixel distance divided by the first per-pixel distance and the second per-pixel distance; and
using the first ratio to determine the first weight and the second ratio to determine the second weight.

10. The method of claim 1, further comprising:
including the first weight and the second weight in an encoded bitstream being sent to a decoder for use in decoding the current block.

11. The method of claim 1, further comprising:
using the prediction block to calculate a residual that is a difference between the prediction block and the current block; and
including the residual in an encoded bitstream.

12. The method of claim 1, further comprising:
applying a residual from an encoded bitstream to the prediction block to determine pixel values for the current block.

13. The method of claim 1, wherein comparing the characteristic of the first region to the characteristic of the third region and comparing the characteristic of the second region to the characteristic of the third region comprises:
calculating a first distance between the first region and the third region, and a second distance of the second region and the third region; and
adaptively determining the first weight to be 1 and the second weight to be 0, if a ratio of the first distance and the second distance is less than a threshold value.

14. The method of claim 1, wherein comparing the characteristic of the first region to the characteristic of the third region and comparing the characteristic of the second region to the characteristic of the third region comprises:
calculating a first distance between the first region and the third region, and a second distance of the second region and the third region; and
adaptively determining the first weight to be 0 and the second weight to be 1, if a ratio of the first distance and the second distance is larger than a threshold value.

15. The method of claim 1, wherein comparing the characteristic of the first region to the characteristic of the third region and comparing the characteristic of the second region to the characteristic of the third region comprises:
calculating a first distance between the first region and the third region, and a second distance of the second region and the third region;
when a ratio of the first distance and the second distance is less than a first threshold value, adaptively determining the first weight to be 1 and the second weight to be 0;
when the ratio of the first distance and the second distance is larger than a second threshold value, adaptively determining the first weight to be 0 and the second weight to be 1; and
when the ratio of the first distance and the second distance is not less than the first threshold value and is not larger than the second threshold value, adaptively determining the first weight for the first reference block and the second weight for the second reference block.

16. The method of claim 1, wherein the characteristic is luminance.

17. A non-transitory computer-readable storage medium containing instructions, that when executed, control a computer system to be operable for:
selecting a first reference block in a first reference frame and a second reference block in a second reference frame, the first reference block and the second reference block being used to predict a current block in a current frame;
selecting a first region in the first reference frame based on the first reference block, a second region in the second reference frame based the second reference block, and a third region in the current frame based on the current block;

comparing a characteristic of the first region to a characteristic of the third region to generate a first comparison value;

comparing a characteristic of the second region to the characteristic of the third region to generate a second comparison value;

calculating a first weight for the first reference block and a second weight for the second reference block based on the first comparison value and the second comparison value;

adaptively calculating a prediction block for the current block using the first weight and the second weight; and using the prediction block in a transcoding process or a decoding process associated with the current block.

18. The non-transitory computer-readable storage medium of claim 17, wherein adaptively calculating the prediction block comprises:

applying the first weight to the first reference block to generate a first result;

applying the second weight to the second reference block to generate a second result; and blending the first result and the second result to generate the prediction block.

19. The non-transitory computer-readable storage medium of claim 17, wherein the first region and the second region are regions that neighbor the first reference block and the second reference block, respectively.

20. An apparatus comprising:

one or more computer processors; and a non-transitory computer-readable storage medium comprising instructions, that when executed, control the one or more computer processors to be operable for:

selecting a first reference block in a first reference frame and a second reference block in a second reference frame, the first reference block and the second reference block being used to predict a current block in a current frame;

selecting a first region in the first reference frame based on the first reference block, a second region in the second reference frame based the second reference block, and a third region in the current frame based on the current block;

comparing a characteristic of the first region to a characteristic of the third region to generate a first comparison value;

comparing a characteristic of the second region to the characteristic of the third region to generate a second comparison value;

calculating a first weight for the first reference block and a second weight for the second reference block based on the first comparison value and the second comparison value;

adaptively calculating a prediction block for the current block using the first weight and the second weight; and using the prediction block in a transcoding process or a decoding process associated with the current block.

* * * * *